United States Patent [19]
Ramakrishnan et al.

[11] Patent Number: 5,511,076
[45] Date of Patent: Apr. 23, 1996

[54] METHOD AND APPARATUS TO EFFICIENTLY REUSE VIRTUAL CONNECTIONS BY MEANS OF CHASER PACKETS

[75] Inventors: Kadangode K. Ramakrishnan, Maynard; Peter J. Roman, Hopkinton, both of Mass.; Michael Ben-Nun, Jerusalem; Simoni Ben-Michael, Givat Zeev, both of Israel

[73] Assignee: Digital Equipment Corporation, Maynard, Mass.

[21] Appl. No.: 335,539

[22] Filed: Nov. 7, 1994

[51] Int. Cl.$^6$ .................................................. H04L 12/56
[52] U.S. Cl. ................................ 370/94.2; 395/200.02
[58] Field of Search ........................ 370/60, 60.1, 94.1, 370/94.2, 110.1; 395/200, 250

[56] References Cited

U.S. PATENT DOCUMENTS 5,050,166  9/1991  Cantoni et al. .......................... 370/94.1
5,067,123  11/1991  Hyodo et al. ........................... 370/94.1
5,193,149  3/1993  Awiszio et al. ........................... 395/200
5,237,569  8/1993  Sekihata et al. ........................ 370/94.1
5,420,858  5/1995  Marshall et al. ........................ 370/60.1

Primary Examiner—Hassan Kizou
Attorney, Agent, or Firm—Christine M. Kuta; David A. Dagg

[57] ABSTRACT

A host system and an ATM network adapter using a chaser packet are presented. The adapter receives cells over a virtual connection on the network and generates, in response to the host system, a chaser packet which allows the host to detect that all data has been transferred form the adapter buffers to host memory. When all data has been transferred, the host may release the virtual connection without data loss. The host and adapter may also transmit data. In data transmission, the chaser packet is used to determine that all data has been transmitted out onto the network before the sending host releases the virtual connection. The chaser packet is also used for resynchronization of credits where the ATM network uses credit-based flow control. The adapter uses the chaser packet to drain the local queue so that the link between the adapter and a source system may be resynchronized.

9 Claims, 9 Drawing Sheets

| 31 | | | | 16 | | | 0 |
|---|---|---|---|---|---|---|---|
| SEG_LEN | | | | RESERVED | | | |
| SEG_ADDR | | | | | | | |
| GFC | | PT | CLP | VPI | | VCI | |
| SOB | EOB | XMIT_MOD | | HEC | CPCS-UU | | CPI |

FIG. 9

| OAM | CHASER | IOX | SET_EOP | CHECK_CRC | ADD_TRL |
|---|---|---|---|---|---|

FIG. 10

METHOD AND APPARATUS TO EFFICIENTLY REUSE VIRTUAL CONNECTIONS BY MEANS OF CHASER PACKETS

FIELD OF THE INVENTION

The present invention relates generally to the field of computer networks and, more particularly, to closing or resynchronizing virtual connections in ATM networks.

BACKGROUND OF THE INVENTION

Asynchronous transfer mode (ATM) is a class of digital switching technologies for computer networks. ATM networks relay and route traffic by means of a virtual circuit identifier (VCI) and a virtual path identifier (VPI) contained within the cell. Compared to common packet technologies, such as X.25 or frame relay, ATM uses relatively short, fixed length units of information called cells. In applications utilizing ATM, larger packets at a source are first broken up into these fixed length packets (ATM cells), transmitted, and then reassembled at a destination. ATM cells are 53 bytes long. They consist of a 5-byte header containing a virtual circuit identifier, virtual path identifier, and other information, and a 48 byte information field. The header of an ATM cell contains all the information the network needs to relay the cell from one node to the next over a pre-established route. User data is contained in the remaining 48 bytes.

ATM uses virtual circuits to pass data between two nodes. These connections between two nodes are termed "virtual circuits" to distinguish them from dedicated circuits. A virtual circuit is a path made up of a number of links between a first node and a second node in the network. ATM cells transmitted on the virtual circuit always traverse the same path between the first node and the second node. When cells are successfully received at the destination, they are reassembled into information packets. Virtual circuits allow common physical links to be shared among multiple users.

There are two types of virtual connections (also known as virtual circuits). Each virtual circuit is identified by a unique virtual connection number. A first type of virtual circuit is the Permanent Virtual Circuit (PVC). For each PVC, there is a predetermined, permanent VCN (Virtual Connection Number) which is defined at each switch or end node before the network is up and running. A second type of virtual circuit is the SVC (Switched Virtual Circuit). SVC connections are set up or disconnected while the network is running. SVC's are set up by utilizing a signalling protocol which assigns a currently available VCN to the connection. A VCN currently assigned to an existing SVC becomes available when the existing SVC is closed.

With ATM, the successful transmission of packets from a source to a destination requires successful delivery of all the ATM cells derived from the original information packet. If any one cell is lost, the entire packet must be re-transmitted. When the ATM station repeatedly tries to resend the original information packet, the network becomes increasingly loaded as more network congestion occurs and more cells are lost. Also, end-systems and switches in the network have limits to the number of virtual connections they can keep open. This is because they have a limited amount of memory that is available to keep the virtual connection state information. Reusing virtual circuits is therefore often necessary. This reuse of virtual circuits needs to be done without cell loss which would otherwise result in inefficiency.

Cells may be lost at a destination system or a receiving node when the virtual connection is closed in order to re-assign the VCN of that connection to another virtual connection. If that virtual connection is closed and reassigned to a second virtual connection before all of the transmitted cells arrive and get transferred into memory, the cells of the first virtual connection are lost and the cells of the second virtual connection will not belong with the data already received. Similar to the destination system, cells may be lost if the source system closes the virtual connection before all the cells have been transmitted. The destination system needs a way to determine that all of the received cells are delivered and the source system needs a way to determine that all the cells have been transmitted. The destination system also needs to see that none of the cells from an old virtual connection get delivered to an application that is reusing the virtual connection.

In current ATM implementations, a worst case time duration for fully receiving and transmitting cells to memory is determined and the destination system waits for that period of time before reusing a virtual connection after a close command has been issued. The source system in current implementations simply waits until all previously-queued transmit cells or packets are transmitted, regardless of network conditions. If all the cells have not yet been transmitted, when the virtual connection is closed, the cells and the packets they belong to are lost. These wait periods are inefficient and sometimes ineffective ways of assuring that a virtual connection may be closed and reassigned. Furthermore, these wait periods depend on the system issuing a close command for the virtual circuit having assured itself that no more data was sent on that virtual circuit before the system issues the close command. The wait to ensure that all pending data goes out of the sending system can be large, especially in a congested network.

The ability to reuse VCNs quickly is especially important for lower cost adapters and switches that support only a limited number of VCNs. Avoiding long wait periods improves overall adapter and switch performance and enables adapter and switches to efficiently use the smaller pool of VCNs.

It is therefore desirable to have a more efficient and effective means for closing virtual circuits.

SUMMARY OF THE INVENTION

The problems of cell loss and long wait periods before closing virtual connections are solved by a host system and network adapter having a chaser packet.

The adapter receives cells over a virtual connection on the network and generates, in response to the host system, a chaser packet which allows the host to detect that all data has been transferred from the adapter buffers to host memory. When all data has been transferred, the host may release the virtual connection without data loss. The host and adapter may also transmit data. In data transmission, the chaser packet is used to determine that all data has been transmitted out onto the network before the sending host releases the virtual connection.

The chaser packet is also used for resynchronization of credits where the ATM network uses credit-based flow control. The adapter uses the chaser packet to drain the local queue so that the link between the adapter and a source system may be resynchronized.

BRIEF DESCRIPTION OF THE DRAWINGS

The present invention together with the above and other advantages may best be understood from the following detailed description of the embodiments of the invention illustrated in the drawings, wherein:

FIG. 9 is a transmit descriptor;

FIG. 10 is the format of the Xmit_Mod field; and

DETAILED DESCRIPTION

Figure 1:
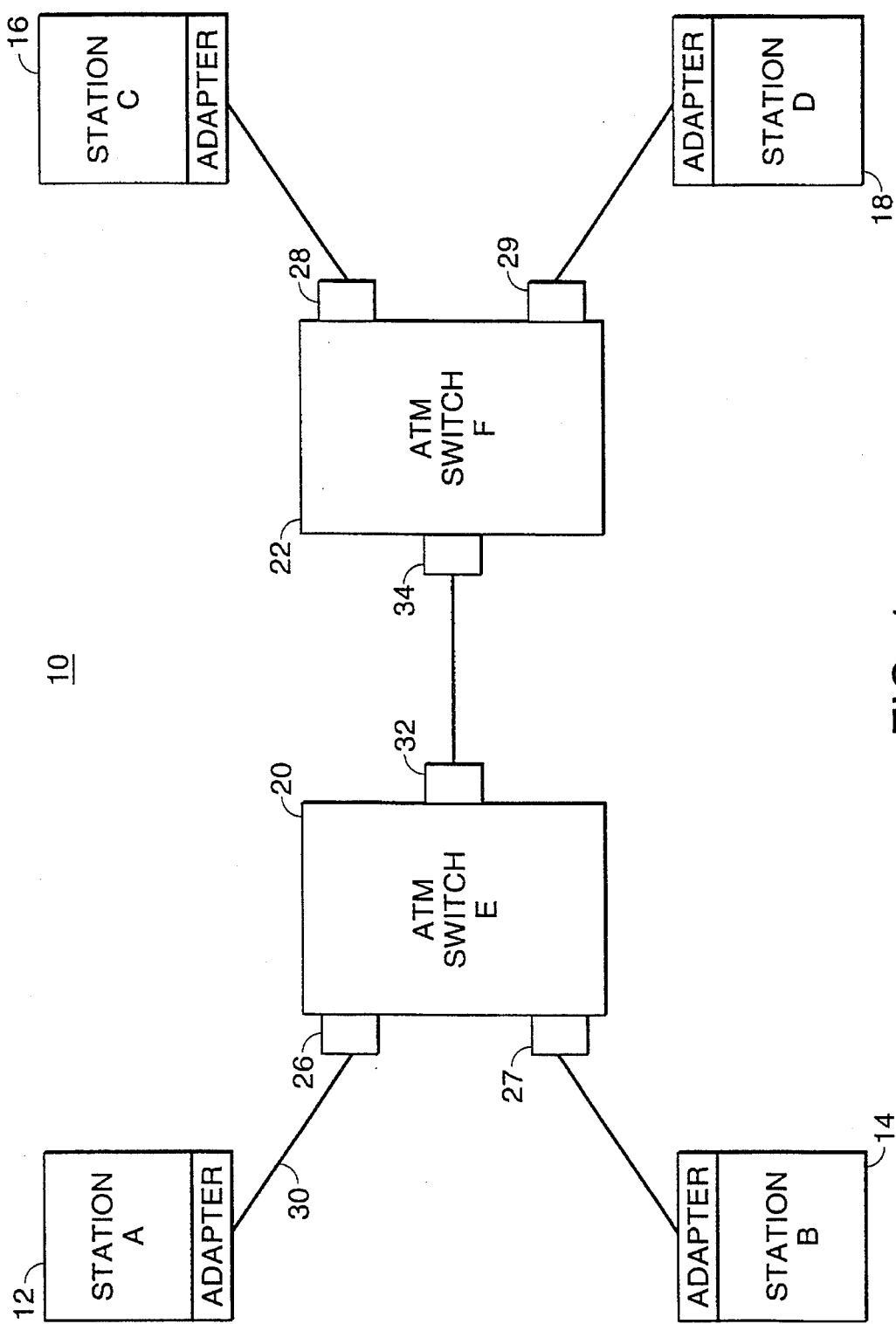
FIG. 1 is an ATM network.

FIG. 1 shows an exemplary asynchronous transfer mode (ATM) local area network (LAN) 10 which includes four stations, A 12, B 14, C 16, and D 18. The ATM LAN 10 also includes ATM switch E 20 and ATM switch F 22. An ATM adapter resides in each of the stations 12, 14, 16, 18. The ATM switches also have ports 32, 34, each port dedicated to the switch of the other port. The ATM adapter provides an interface between the stations 12, 14, 16, 18 and the switches 20, 22. The ATM switches have ports 26, 27, 28, 29 each dedicated to one of the stations 12, 14, 16, 18. By way of example, if station A 12 is transmitting packets for station C 16, the ATM adapter in station A 12 is involved in segmenting the packets into cells, and affixing the appropriate fields in a cell header (of FIG. 2 and FIG. 3). The ATM adapter of station C 16 is involved in reassembling the cells received into a complete packet and delivering the packet to station C 16. Control of the ATM LAN 10 resides in the ATM switches E 20 and F 22, which route messages between the stations 12, 14, 16, 18 and control access in the event of congestion. For example, the station A 12 may send a cell over a line 30 to ATM switch E 20 through port 26. ATM switch E 20 will route the cell to a destination, station C 16, for example, according to a VCI/VPI in an ATM cell header (more fully described with reference to FIG. 2 and FIG. 3).

Because each port 26, 27, 28, 29 is dedicated to one of each of the stations 12, 14, 16, 18, the other stations do not have to contend for access to the ATM switches 20, 22. Thus, station A 12 has full access to the line 30 regardless of the activity of other stations with other such connections. For example, if a 5 Mb file is being transmitted from station A 12 to station C 16, it can move to the ATM switch E 20 in a continuous burst at the prescribed rate, possibly the full channel rate, instead of sharing the communication link in the other stations and having intervening frames from other stations as with other LANs, such as Ethernet, Token Ring, and Fiber Distributed Data Interface (FDDI) LANs.

Figure 2:
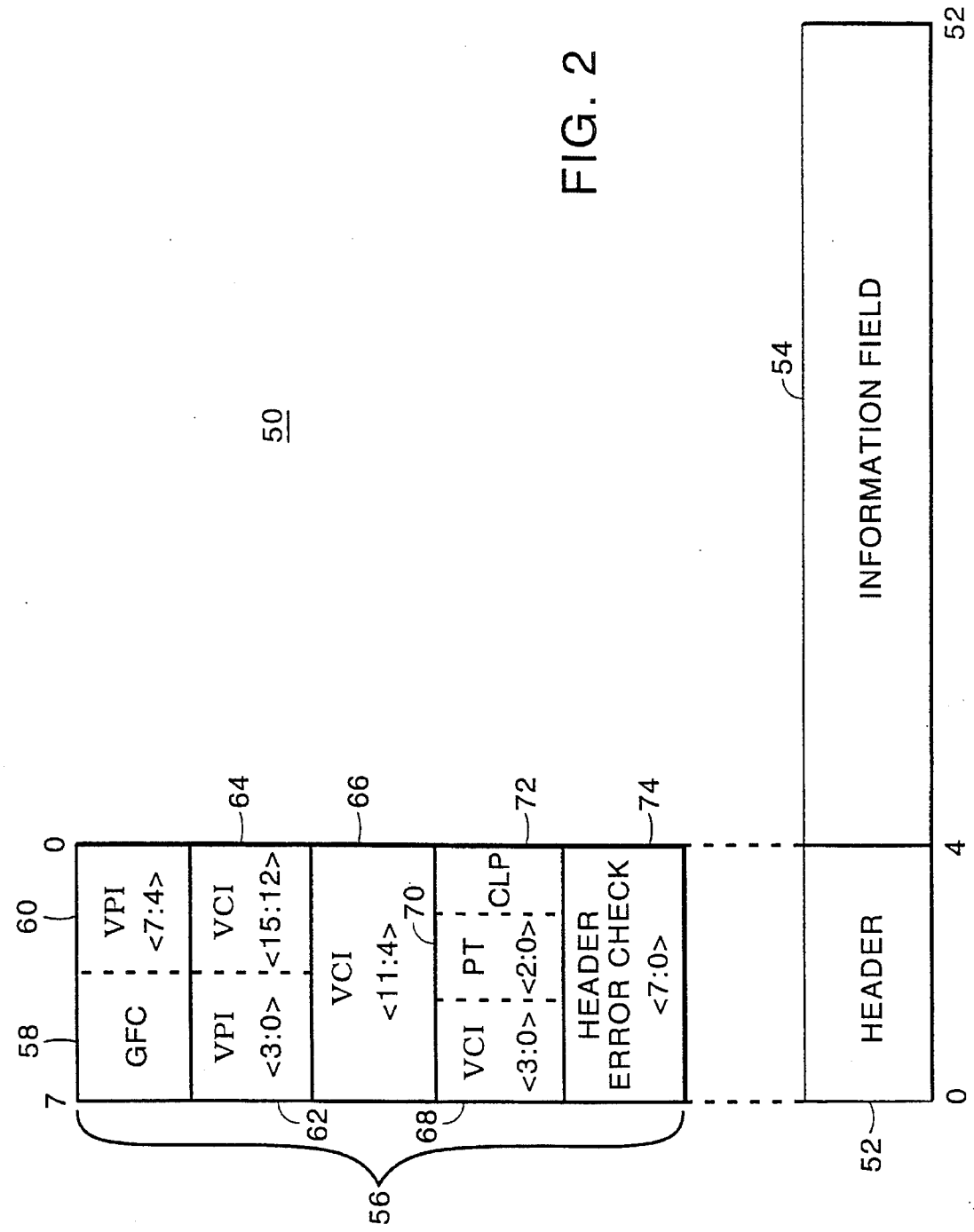
FIG. 2 is an ATM cell.

Each message in the ATM LAN 10 is comprised of one or more fixed length units of data called ATM cells. Referring to FIG. 2, an ATM cell 50 is shown to be 53 bytes long. The ATM cell 50 is typically divided into a 5-byte header 52 and a 48-byte information field 54. The 5-byte header 52 contains several fields 56. Specifically, a first byte contains a generic flow control (GFC) field 58 and a part of a virtual path identifier (VPI) field 60. A second byte contains another part of the VPI field 62 and part of a virtual channel identifier (VCI) field 64. A third byte contains another part of the VCI field 66. A fourth byte contains the remaining part of the VCI field 68, a payload type identifier (PT) field 70, and a cell loss priority field (CLP) 72. A fifth byte contains a header error check 74.

The address of the ATM cell 50 is contained in the fields labeled VPI 60, 62 and VCI 64, 66, 68. This two-part identification allows the ATM LAN 10 (of FIG. 1) to route data contained in the information field 54 between locations while maintaining the identity of individual circuits within a trunk.

Figure 3:
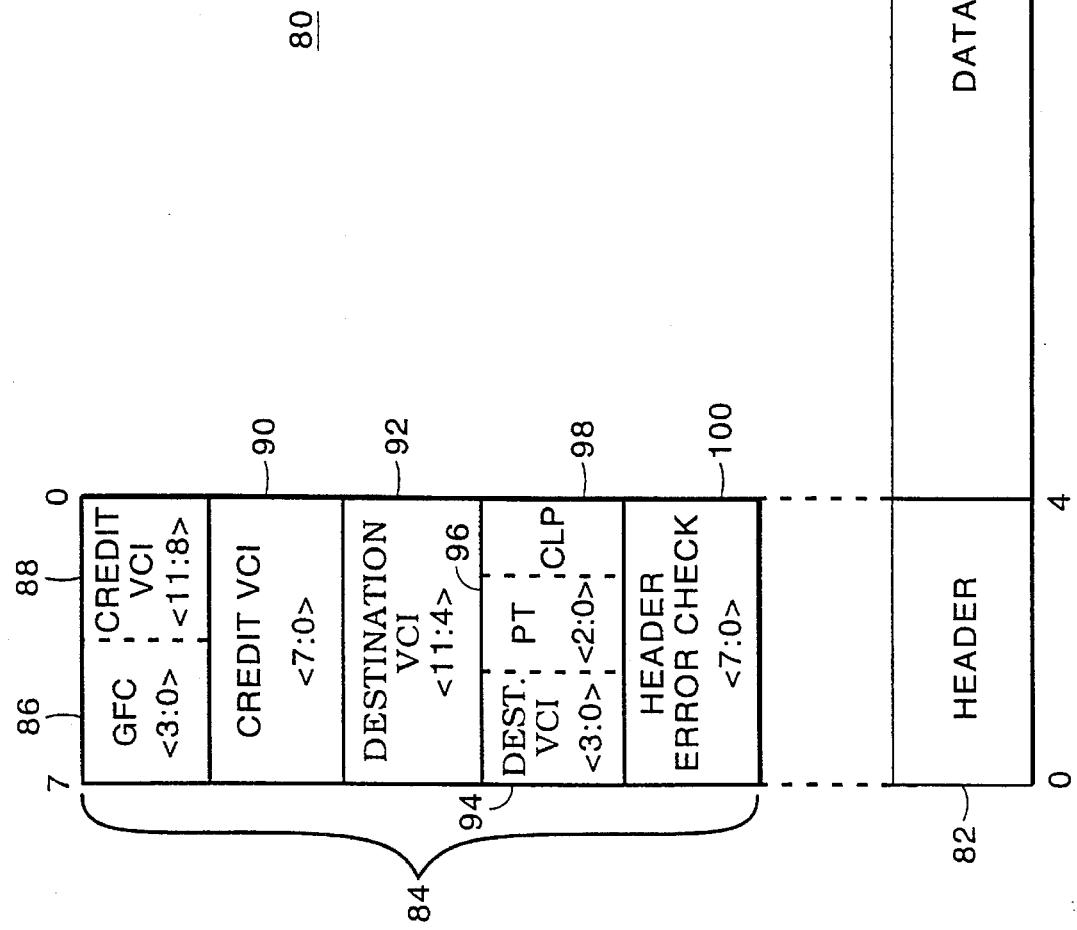
FIG. 3 is an alternative ATM cell.

FIG. 3 shows an ATM cell 80 with an alternative header 82. The header 82 is 5 bytes long and contains several fields 84. Specifically, a first byte contains a GFC field 86 and a part of credit virtual circuit identifier (credit VCI) 88. A second byte contains another part of credit VCI 90. A third byte contains part of a destination VCI 92. A fourth byte contains a remaining part of the destination VCI 94, a PT field 96, and a CLP field 98. A fifth byte contains a header error check field 100.

As mentioned above, with any LAN, network-based applications in one station create packets for transmission to other stations. The ATM LAN 10 breaks packets into fixed-size (53-bytes) cells before they are transmitted. For network equipment designers, the challenge with small cells is that loss of any single cell destroys the entire packet of which it is a part. For example, a 9180 byte packet is broken into 192 ATM cells (48 bytes of data per ATM cell). The loss of any one cell requires retransmission of all 192 ATM cells.

Figure 4:
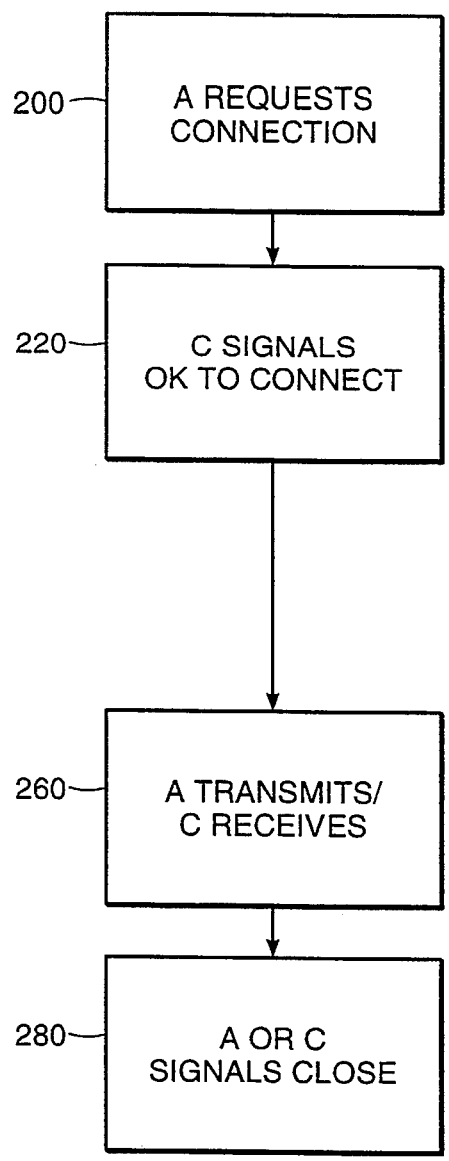
FIG. 4 is a flow chart of data transmission.

FIG. 4 shows a flow chart of data transmission between stations in an ATM network. Using the stations of FIG. 1 as an example, if station A 12 has data to send to station C 16, station A sends a request for connection signal to station C 16, block 200. The request for connection signal is sent on a pre-existing virtual circuit which is reserved for connection requests. The preexisting virtual circuit, also called the signalling virtual circuit, is described in "ATM User-Network Interface Specification, V. 3.0," The ATM Forum, PTR Prentice Hall, 1993, p. 156. The connection request signal contains set-up information for a virtual connection for data. If station C 16 is ready to receive data, station C 16 sends a signal back over the preexisting virtual circuit to station A 12 that a data connection may be made, block 220. The switch assigns a VPI and VCI value for this new connection set up. The adapters in station A 12 and station C 16 identify this data virtual connection by a virtual connection number (VCN). The VCN may be an index into a table (shown in FIG. 5) within which the switch assigned VPI-VCI values may be stored. Station A 12 then transmits the data, broken into cells, along the virtual connection and the adapter of station C 16 receives the cells and reassembles them into data packets, block 260. Station C 16 may also perform the reassembly of cells to packets. Either station A 12 or station C 16 may signal a close of the virtual connection at the end of the session which is generally the end of transmission, block 280. The close signal (also called a RELEASE signal or RELEASE request) is sent over the preexisting virtual connection reserved for signalling. When the virtual connection for data is released, the VCN of that connection may then be used to identify a new virtual connection.

Figure 5:
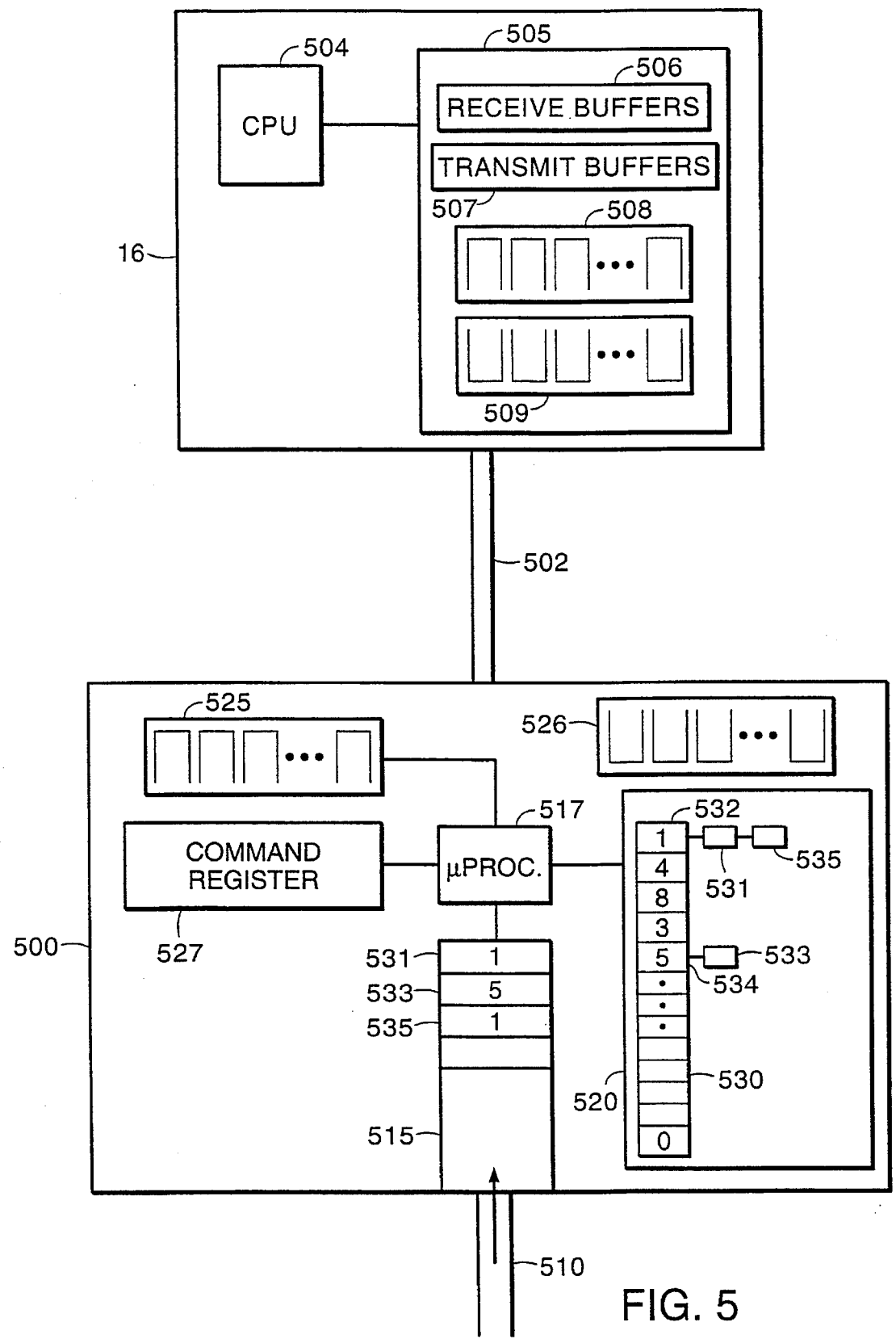
FIG. 5 is a network adapter and host.

The adapter of a station receiving data, for example station C 16, is shown in FIG. 5. FIG. 5 shows the adapter 500 connected to the host, station C 16 by a bus 502. The host 16 has a CPU 504, a memory 505 with receive buffers 506 and transmit buffers 507, receive packet queues 508 and transmit packet queues 509. The adapter 500 is connected to the network 10 by a network connection line 510. The adapter 500 has a first-in-first-out (FIFO) queue 515 for receiving cells from the network. The adapter 500 also has a microprocessor (controller) 517, a packet buffer 520 for reassembling the cells into packets, a number of receive packet queues 525 for transferring assembled packets to the host 16, a number of transmit packet queues 526 and a special command register 527. The adapter controller 517 could also be a special-purpose chip or circuit such as an ASIC. The number of receive packet queues 525 and transmit packet queues 526 in the adapter is equal to the number of receive packet queues 508 and transmit packet queues 509 in the host 16 respectively. The queues do not contain the actual data but contain descriptors of the buffers where the data exists.

Cells from a plurality of virtual connections enter the adapter 500 and are stored in the FIFO queue 515 to await reassembly in the packet buffer 520. The packet buffer 520 maintains a list 530 of all the virtual connection numbers (VCNs) in use. The list 530 is represented as having exemplary VCNs 1 through n. A cell is taken from the FIFO 515 and linked to the particular VCN in the packet buffer 520 which matches the VCN of the virtual connection in the network over which the cell came. For example, a cell 531 coming over a virtual connection numbered 1 would be linked to VCN 1 532 in the list inside the packet buffer 520. A cell 533 coming over a virtual connection numbered 5 would be linked to the list in the packet buffer 520 to VCN 5 534. A second cell 535 coming in from virtual connection 1 would be linked to the first cell 531, and a third cell would be linked to the second 535 and so on until the entire packet has been received. When the entire packet has been received, it is transferred to one of the packet queues 525 to await transfer to the host 16. When all the data packets in a particular transmission have been received, the host 16 may then close the virtual connection for that transmission and may then re-use the VCN associated with the closed virtual connection for a new virtual connection. Alternatively, a host may close the connection before the end of the transmission, for instance if it is no longer able to receive data for some reason.

However, before the host 16 closes the virtual connection, the host 16 must first determine that all the data stored in the packet queues 525 belonging to the virtual connection about to be closed has been transferred into the host memory 505. The host 16 needs to determine this in order to distinguish between data coming in from a new virtual connection using a particular VCN from data from the old virtual connection using that VCN. The host 16 also needs to have a policy for dealing with the partially reassembled packets that may reside in the packet buffer 520. The policy may be to discard the cells or to deliver them to the host for error accounting. Closing the connection before all the data has been transferred to the host memory 505 results in data loss, especially if completely reassembled packets are still waiting on the adapter, and exposes the new virtual connection that is set up with the same VCN to the potential of receiving data from the old virtual connection.

When the host 16 decides to close a connection or when it receives a close connection signal from the sending host, the host 16 issues a command to the adapter to stop taking data from the virtual connection to be closed and to generate a chaser packet. The adapter microprocessor 517 uses the special command register 527 to generate the chaser packet and puts the chaser packet at the end of the list for the VCN to be closed in the packet buffer 520. The chaser packet then gets transferred to the end of the queue being used for packets from the virtual connection to be closed. The host 16 knows that all the packets from the queue have been received when the chaser packet has been transferred from the adapter to the host memory. Since the upstream switch is assumed to have stopped transmitting cells on that VCI, no further packets on that VCN will be delivered to the host memory after receipt of the chaser packet.

Figure 6:
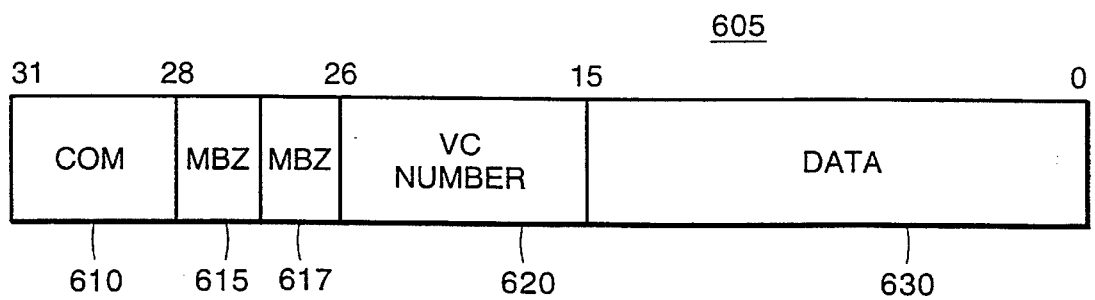
FIG. 6 is the command register format.

FIG. 6 shows an exemplary format of the special command register 527. The COM field 610 contains the commands for closing the virtual connection and generating the chaser packet. The fields labeled MBZ 615 and 617 are always set to zero. The VCN field 620 contains the VC number of the virtual connection for which the chaser packet is being generated. The data field 630 contains information to be loaded into the header of the chaser packet, including a receive buffer status longword, which will be described below in the discussion of the receive buffer 506 in the host memory 505.

When the adapter 500 transfers the chaser packet into the host memory 505, the adapter 500 notifies the host 16 by interrupt that a chaser packet has been transferred. A status longword is associated with every data packet sent to the host. The status longword has a bit which when set indicates that a received packet is a chaser packet.

Figure 7:
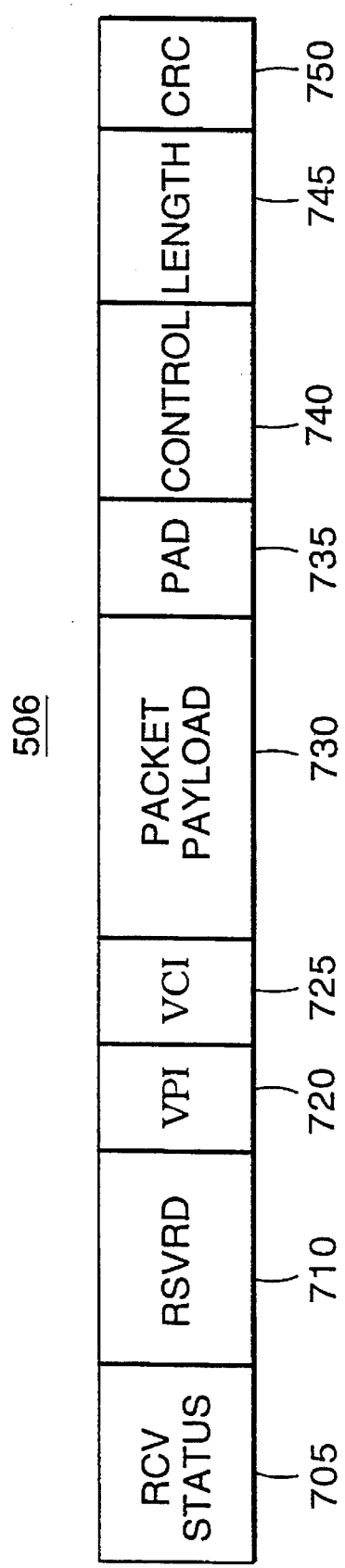
FIG. 7 is the format of the receive buffer.

FIG. 7 shows the format of the receive buffer 506 in the host memory 505. The receive buffer has a RCV status field 705, a Rsvrd field 710, a VPI field 720, a VCI field 725, a packet payload field 730, a PAD field 735, a control field 740, a length field 745 and a CRC field 750. The packet payload field 730, PAD field 735, control field 740, length field 745 and CRC field 750 may vary. For the chaser packet, the packet payload field 730, the PAD field 735, the control field 740, the length field 745 and the CRC field 750 are not used. The chaser packet indication bit of the RCV status field is set for the chaser packet and the Rsvrd field 710, the VPI field 720 and the VCI field 725 are loaded with information from the command register 527 contained in field 620. The 8 most significant bits from the command register Data field 630 are loaded into the Rsvrd field 710 of the receive buffer 506. The 8 least significant bits from the command register Data field 630 are loaded into the VPI field 720. The contents of the COM field 610, the MBZ fields 615, 617 and the VC number field 620 are loaded into the VCI field 725.

Returning to a consideration of FIG. 5 for transmission of packets, the packets are placed in the transmit queues 509 in the host 16. The adapter 500 then segments the packets into cells and send them out over the network via a virtual connection. The software in the sending host 16, also called a driver, must take steps to avoid losing data when closing a virtual connection at the end of a transmission and re-assigning the VCN associated with the closed virtual connection. After closing the virtual connection, the driver must ensure that no data associated with the closed connection is transmitted out to the network so that the ATM switch downstream from the adapter does not detect data for a virtual connection which no longer exists and for which the switch's routing table no longer contains useful information. Also, before re-using the VCN for a new virtual connection, the driver must ensure that all data associated with the old virtual connection has been either transmitted or discarded in order to ensure that data from an old, closed virtual connection is not mistaken for data from a new virtual connection which is reusing the VCN of the old connection. A flush table in the adapter and a transmit chaser packet are used to stop data from being transmitted and to discard data when a virtual connection is closed before the data can be sent.

Figure 8:
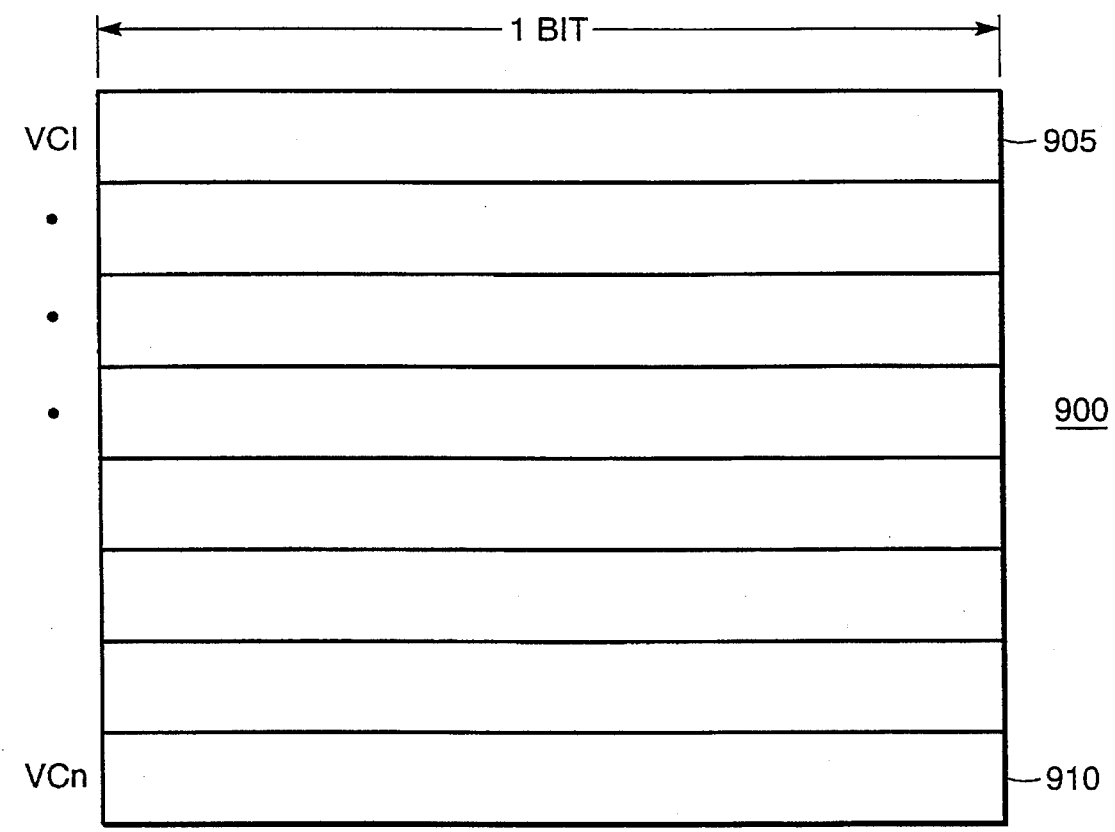
FIG. 8 is a flush table.

FIG. 8 shows a flush table 900. The flush table is a table of 1-bit entries, entry VC1 905 through VCn 910. Each entry in the flush table 900 is associated with a single VCN. The driver 16 may set and read individual bits in the flush table 900. When a bit in the flush table 900 for a specific VCN is set, the adapter 500 will not transmit any data for that VCN. The adapter 500 will instead discard the data. The data is discarded at the same rate as it would have been transmitted had the flush bit for the VCN not been set, except that any flow control being applied to the VCN is not applied to the flushing of the data for the VCN. A flush bit is cleared and the discarding of data for a VCN are terminated through the use of transmit chaser packets.

A transmit chaser packet is a specially-defined 48-byte packet which is used to terminate the flushing of data for specific VCN. The adapter 500 associates each packet in host memory 505 with a single four-longword transmit descriptor. Before transferring a packet to be transmitted from the host memory 505, the adapter 500 must first fetch the descriptor which describes the type of packet to be transferred. FIG. 9 shows the format of the transmit descriptor. The Seg_Len field holds the length of the data in bytes and the Seg_Addr field holds the physical address of the data. The GFC field contains flow control information and the PT field contains information on the type of data in the cell payload. The CLP field contains the priority of the transmitted cells. The VPI contains the Virtual Path Identifier and the VCI contains the Virtual Circuit Identifier. The SOB field and the EOB field identify the first and last buffer segment in the host's buffers. The HEC field specifies the HEC value for the transmitted cells. Since the HEC field will usually vary from cell to cell, this field is used only for diagnostic purposes. The CPCS-UU field transfers user information. The CPI field operates in conjunction with the CPCS-UU field. The Xmit_Mod field is a six-bit field used to inform the adapter of the actions it must take when transmitting the packet described by the transmit descriptor.

FIG. 10 shows the format of the Xmit_Mod field of the transmit descriptor. The Xmit_Mod field has an OAM bit, a Chaser bit, a IOX bit, a Set_EOP bit, a Check_CRC bit and an Add_Trl bit. In the chaser packet, the Chaser and IOX bits in the Xmit_Mod field of the transmit descriptor are set for use in flushing and closing a VCN.

When the driver 16 makes the decision to close a VCN, it may wait for a period of time to ensure that all of the data for the VCN leaves the adapter normally as opposed to being discarded if the driver closes the VCN immediately. Once the VCN is closed, the driver sets the flush bit corresponding to that VCN in the flush table. The driver then generates and queues the chaser packet. The chaser packet is queued on the VCN to be closed using the same host transmit queue used to transmit all other data for the VCN. The driver then waits for the adapter to generate the interrupt indicating that the chaser packet has been transmitted. The adapter generates an interrupt when the chaser packet is detected at the head of the adapter transmit queue. The adapter also clears the bit in the flush table for the VCN on which the chaser packet was encountered. When the driver detects the interrupt, it reads the bit in the flush table associated with the VCN to ensure that it has been cleared. Once the driver detects that the bit in the flush table has been cleared, the driver knows that all data for the VCN has either been transmitted or discarded, and the driver may now reuse the VCN for another virtual connection.

The chaser packet is also useful in the resynchronization of credits where the ATM network uses hop-by-hop credit-based flow control. In credit-based flow control, a downstream node on a link tells a source (upstream node on that link) that there are some number of cell buffers available, for example 10. This number is referred to as the number of credits available to the upstream source node. The upstream source node sends out cells to the destination and counts down from 10 to zero and then stops sending cells. However, in the meantime, the destination forwards the received cells, as in a switch forwarding cells to the next hop. When the destination forwards a cell, the destination also signals the source to increment the number of credits for the VC associated with the cell. In this way, the source only sends cells when there are available buffers at the destination. However, credits may be lost due to various network problems such as bit errors and other forms of data corruption. The result is that the link becomes underutilized and the upstream and downstream nodes' credit values needs to be resynchronized.

To resynchronize a VC on an underutilized link, the source (upstream node, for example a switch) sends out a resynchronization request for a VC. The downstream node, which may be a destination adapter, then empties out all the cell buffers that have been reassembled into packets and discards all the cells of partially reassembled packets of that VC. Completion of this process is accomplished through the use of a chaser packet. The chaser packet is queued behind all of the previously received cells for the VC. On receiving the chaser packet, the host knows that all of the data for that VC has been received or discarded. The host then sends a resynchronization complete message, which includes the "initial credit" information, to the source telling the source the correct number of credits to use henceforth.

Figure 11:
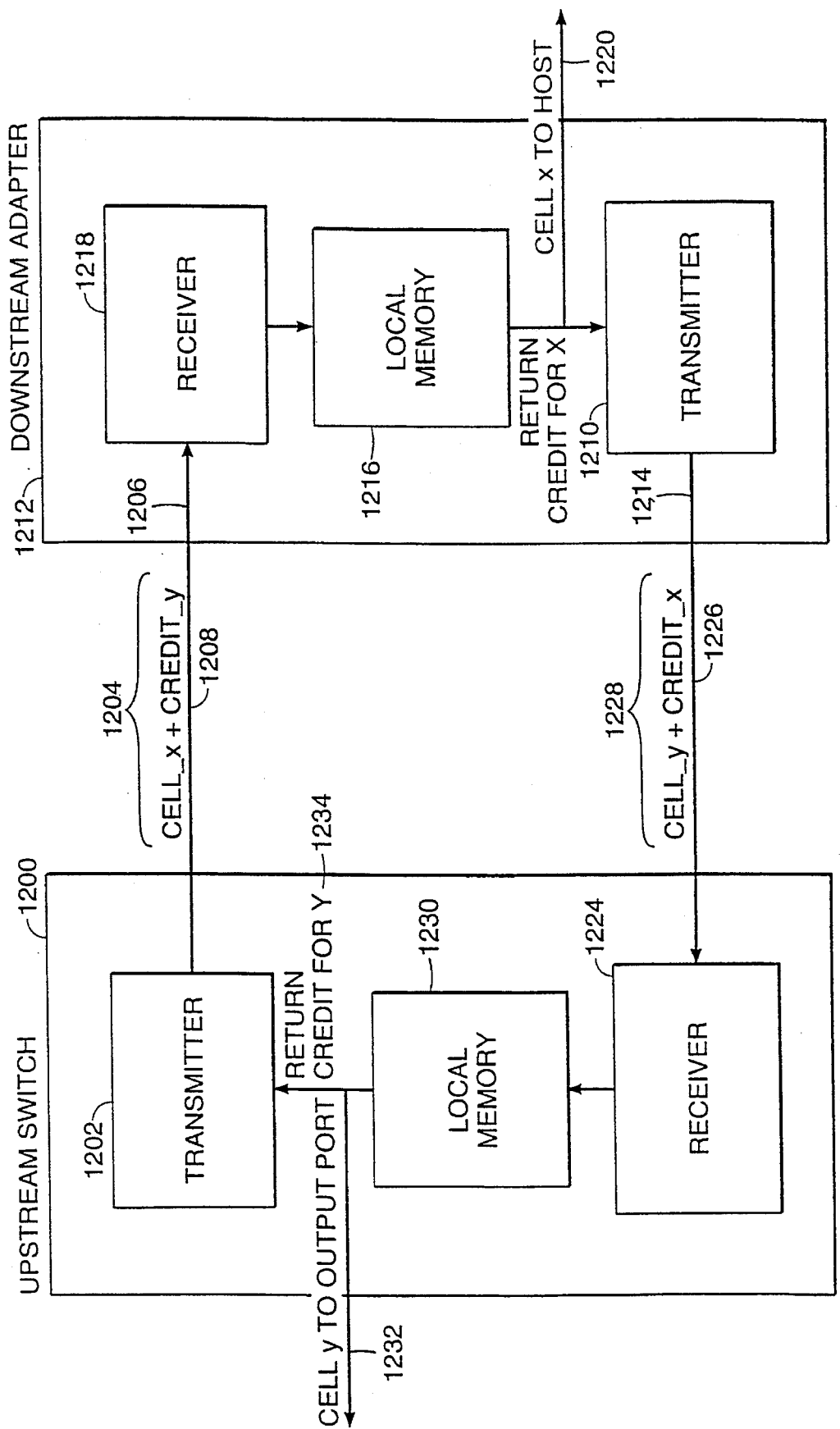
FIG. 11 is a diagram of credit-based ATM flow.

In FIG. 11, an exemplary credit-based ATM flow control system is illustrated. In the exemplary credit-based ATM flow control system a transmitter portion 1202 of an upstream ATM switch 1200 is sending an ATM cell 1204 on virtual circuit identifier (VCI) 1206. The credit field 1208 in ATM cell 1204 is carrying a credit for a transmitter portion 1210 of a downstream ATM adapter 1212 for VCI 1214. A credit is simply an okay to send one or more ATM cells on a VCI, with the assurance that the cell(s) will have a buffer at the remote end and hence not experience loss.

In the exemplary credit-based ATM flow control system of FIG. 11, when the downstream ATM adapter 1212 moves the ATM cell 1204 of VCI 1206 from its local memory 1216 from a receiver portion 1218 and into a host memory 1220, the downstream ATM adapter 1212 generates a credit 1226 for the transmitter portion 1202 of the upstream ATM switch 1200 to allow transmission of a new ATM cell (not shown) on VCI 1206. Other adapter designs may return a credit 1226 on receiving the ATM cell 1204 and storing it in local memory 1216. This credit for the transmitter portion 1202 can be carried by any ATM cell transmitted by the transmitter portion 1210 of the downstream ATM adapter 1212 to a receiver portion 1224 of the upstream ATM switch 1200. For example, in FIG. 11 a credit 1226 for VCI 1206 is carried on an ATM cell 1228 on VCI 1214.

The receiver portion 1224 of the upstream ATM switch 1200 receives the ATM cell 1228 from the transmitter portion 1210 of the downstream ATM adapter 1212 and stores it in its local memory 1230. The upstream ATM switch 1200 uses the credit 1226 to transmit another cell on VCI 1206. When the upstream ATM switch 1200 moves the ATM cell 1228 from its local memory 1230 to one of its output ports 1232, the upstream ATM switch 1200 generates a credit 1234 for VCI 1214, which will be carried by any ATM cell transmitted towards the downstream ATM adapter 1212.

In order to be able to maintain a full link speed for each virtual circuit, it is necessary to provide each transmit VC with an adequate initial fixed number of credits. The number of initial credits for each VC is typically set to be sufficient for the VC to flow at the full link rate, and for the credit for the first cell sent in a given burst of cells to have its credits returned to the sender before the sender exhausts its initial credits, if there is no contention from any other VC on the link. In other words, this number should be large enough to ensure that the transmitter portion 1202 of an upstream ATM switch 1200 will not stop transmitting before the upstream ATM switch 1200 receives a first credit from the transmitter portion 1210 of the downstream ATM adapter 1212. Thus, the receiver portion 1218 of the downstream ATM adapter 1212 should have enough local memory 1216 to accommodate a number of cells corresponding to the transmission of initial credits given to the upstream ATM switch 1200.

In hop-by-hop credit-based ATM flow control, which is described fully with reference to FIG. 11, the credit VCI field (88 and 90) of each arriving ATM cell 80 of FIG. 3 identifies the transmit virtual circuit (VC) which is given a new credit for transmission from a transmitter to a receiver. After moving out this newly arrived ATM cell 80 from its memory buffer (or guaranteeing additional buffering), the receiver should return a credit to the sender. The virtual circuit whose credit is returned is the one that this ATM cell 80 was sent on, i.e., the value of the destination VCI field (92, 94). Transmitting or receiving credits may be done one credit per an ATM cell 80, or in a scheme that may provide a plurality of credits per an ATM cell 80.

Credit resynchronization is performed on a VC-by-VC basis and is initiated by the upstream node on the link. The way in which chaser packets and the flush table are used in credit resynchronization depends on whether a host is the upstream or downstream node on a link.

When the switch 1200 detects underutilization of the switch-adapter link for a VC, the switch (which is the upstream node on the link) sends out a resynchronization request. The host on the downstream end of the link, upon receipt of the resynchronization request, requests the adapter to insert a chaser packet in the receive direction for that VC. When the chaser packet is received by the host, this indicates that all the received packets and cells of partially reassembled packets have been delivered by the adapter. Upon ensuring further that all outstanding credits have been returned to the upstream switch, the host may then send out a resynchronization complete message to the switch. Included in the resynchronization complete message is the initial credit information that the switch may use henceforth.

If the host is the upstream node on a link and it wishes to resynchronize a VC, it must ensure that no cells for that VC remain in host memory or in the transmit queue on the adapter with which the VC is associated. It does so by setting the flush bit for the VC in the flush table 900 in the adapter's local memory 1216 if necessary (exactly as with closing a VC), then queueing a transmit chaser packet for the VC on the transmit queue with which the VC is associated. When the adapter processes the chaser packet, it will clear the flush bit and generate an interrupt to the host. At this point, the host may issue a resynchronization request for the VC to the downstream node, which may be a switch or a host.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A system for closing virtual circuits, comprising:

a host computer having a host CPU, and a host memory; and an adapter connected to said host computer, said adapter having means for receiving cells from a virtual connection on a network, means for assembling said received cells into packets, means for transferring said packets to said host memory responsive to packet completion, means, responsive to said host computer, for generating a chaser packet, means for enqueuing said chaser packet in said means for transferring packets, said chaser packet to be detected by said host computer whereby said host computer may close said virtual connection without loss of data.

2. A system according to claim 1 further comprising a means for said adapter to generate an interrupt to said host computer in response to transferring said chaser packet to said host memory.

3. A system according to claim 1 wherein said means for generating a chaser packet comprises a command register and an adapter controller.

4. A system according to claim 3 wherein said adapter controller is a state machine.

5. A system according to claim 3 wherein said adapter controller is a microprocessor.

6. A system according to claim 1 wherein said means transferring said packets to said host memory comprises a plurality of packet queues, one of said plurality of packet queues transferring packets received over said virtual connection, said chaser packet enqueued by said means for enqueuing on said one of said plurality of packet queues.

7. A system for closing virtual circuits, comprising:

a host computer having a host CPU and a host memory; and, an adapter connected to said host computer, said adapter having means for transmitting cells over a virtual connection on a network, means, responsive to said host computer, for generating a chaser packet, and means for enqueuing said chaser packet in said means for transmitting cells such that said chaser packet is detected by said adapter when all cells have been transmitted over said virtual connection.

8. A system according to claim 7 further comprising:

a means for said adapter to generate an interrupt to said host computer in response to detecting said chaser packet.

9. A system according to claim 7 wherein said adapter further comprises a flush table.

* * * * *